United States Patent
Koskinen et al.

(10) Patent No.: US 12,557,173 B2
(45) Date of Patent: Feb. 17, 2026

(54) EDRX SELECTION AND CONFIGURATION HANDLING

(71) Applicant: Nokia Technologies Oy, Espoo (FI)

(72) Inventors: Jussi-Pekka Koskinen, Oulu (FI); Samuli Heikki Turtinen, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 310 days.

(21) Appl. No.: 18/259,436

(22) PCT Filed: Jan. 15, 2021

(86) PCT No.: PCT/CN2021/072080
§ 371 (c)(1),
(2) Date: Jun. 27, 2023

(87) PCT Pub. No.: WO2022/151331
PCT Pub. Date: Jul. 21, 2022

(65) Prior Publication Data
US 2024/0147571 A1    May 2, 2024

(51) Int. Cl.
*H04W 76/28* (2018.01)
*H04W 76/27* (2018.01)

(52) U.S. Cl.
CPC ........... *H04W 76/28* (2018.02); *H04W 76/27* (2018.02)

(58) Field of Classification Search
USPC ....................................................... 370/328
See application file for complete search history.

(56) References Cited

U.S. PATENT DOCUMENTS

2015/0282083 A1* 10/2015 Jeong .................. H04W 76/28
                                                                370/311
2016/0057701 A1    2/2016 Chol et al.
(Continued)

FOREIGN PATENT DOCUMENTS

CN     107404771 A    11/2017
CN     110913506 A     3/2020
(Continued)

OTHER PUBLICATIONS

Huawei, "Discussion on Support of RRC_INACTIVE for eMTC connected to 5GC", R2-1912617, dated Oct. 2019. (Year: 2019).*
(Continued)

*Primary Examiner* — Jamaal Henson
(74) *Attorney, Agent, or Firm* — ALSTON & BIRD LLP

(57) ABSTRACT

Described herein are methods, apparatuses, and computer program products for extended discontinuous reception (eDRX) selection and configuration handling. An example apparatus includes at least a processor and memory with computer program codes stored in memory. When executed by the processor, the computer program codes can cause the apparatus to perform operations or carry out a method. The operations and/or the method can include at least: receiving, from one or more network nodes, one or more eDRX configurations. The operations and/or the method can further include: based on receiving the one or more eDRX configurations, determining to apply an eDRX or a discontinuous reception (DRX). The apparatus can be a user equipment (UE) or a part of a UE. Determining to apply eDRX or DRX can be based at least on a radio resource control state of the UE or eDRX allowance information received from a network node.

15 Claims, 3 Drawing Sheets

(56) References Cited

U.S. PATENT DOCUMENTS

| | | | | |
|---|---|---|---|---|
| 2016/0205622 | A1* | 7/2016 | Ronneke | H04W 52/0203 |
| | | | | 370/311 |
| 2017/0339745 | A1* | 11/2017 | Uchino | H04W 76/28 |
| 2018/0014347 | A1* | 1/2018 | Nagasaka | H04W 8/22 |
| 2018/0176883 | A1 | 6/2018 | Fujishiro et al. | |
| 2018/0317198 | A1 | 11/2018 | Lee et al. | |
| 2019/0028999 | A1 | 1/2019 | Yerramalli et al. | |
| 2019/0223147 | A1* | 7/2019 | Chen | H04W 68/02 |
| 2019/0373581 | A1 | 12/2019 | Ryu et al. | |
| 2022/0053517 | A1* | 2/2022 | Kim | H04L 1/1812 |

FOREIGN PATENT DOCUMENTS

| | | |
|---|---|---|
| WO | 2014/176883 A1 | 11/2014 |
| WO | 2018/072844 A1 | 4/2018 |
| WO | 2022/147841 A1 | 7/2022 |
| WO | 2022/204994 A1 | 10/2022 |

OTHER PUBLICATIONS

Huawei, "Discussion on Support of RRC_INACTIVE for eMTC connected to 5GC", R2-1912617 (Year: 2019).*
"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304 v16.3.0, (Dec. 2020), 64 pages.
CATT, "On eDRX for NR RRC Inactive and Idle", 3GPP TSG-RAN WG2 Meeting #112 electronic, R2-2009363, (Nov. 2-13, 2020), 3 pages.
Extended European Search Report for European Application No. 21918538.6 dated Sep. 25, 2024, 14 pages.
Huawei et al., "Discussion on eDRX for RRC_INACTIVE and RRC_IDLE", 3GPP TSG RAN WG2 #111-e, R2-2007346, (Aug. 17-28, 2020), 5 pages.
LG Electronics Inc., "Extended DRX for reduced capability devices in RRC_IDLE and RRC_INACTIVE", 3GPP TSG RAN WG2 #111-e, R2-2007401, (Aug. 17-28, 2020), 3 pages.
"New SID on support of reduced capability NR devices", 3GPP TSG RAN Meeting #86, RP-193238, Agenda: 9.1.1, Ericsson, Dec. 9-12, 2019, 5 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.
"3rd Generation Partnership Project; Technical Specification Group Radio Access Network; NR; User Equipment (UE) procedures in Idle mode and RRC Inactive state (Release 16)", 3GPP TS 38.304, V16.2.0, Sep. 2020, pp. 1-39.
"Unified DRX architecture for 5G", SA WG2 Meeting #121, S2-173378, Agenda: 6.5.1, LG Electronics, May 15-19, 2017, pp. 1-2.
"Fallback procedure for Inactive mode", 3GPP TSG RAN WG2 Meeting #108, R2-1915052, Agenda: 6.10.3, Samsung, Nov. 18-22, 2019, 2 pages.
International Search Report and Written Opinion received for corresponding Patent Cooperation Treaty Application No. PCT/CN2021/072080, dated Sep. 28, 2021, 9 pages.
"Discussion on support of RRC_INACTIVE for eMTC connected to 5GC", 3GPP TSG-RAN WG2 Meeting #107bis, R2-1912617, Agenda: 7.1.12.2, Huawei, Oct. 14-18, 2019, 5 pages.
"Clarification of eDRX with RRC-INACTIVE and others", 3GPP TSG-SA WG2 Meeting #136, S2-1911139, ZTE, Nov. 18-22, 2019, 5 pages.
Intention to Grant for European Application No. 21918538.6 dated Apr. 28, 2025, 45 pages.
Office Action for Chinese Application No. 202180090810.9 dated Jul. 31, 2025, 11 pages.
ZTE Corporation et al., "Discussion on eDRX for REDCAP UE", 3GPP TSG-RAN WG2 Meeting #112 electronic, R2-2009247, (Nov. 2-13, 2020), 5 pages.
Office Action for Brazilian Application No. BR112023013943-0 dated Oct. 20, 2025, 14 pages.

* cited by examiner

210: receiving, by a user equipment, from one or more network nodes one or more extended discontinuous reception configurations 220: based on the receiving, determining by the user equipment to apply an extended discontinuous reception or discontinuous reception, wherein the determining is based on at least one of a radio resource control state of the user equipment or extended discontinuous reception allowance information received from a network node

FIG. 2A

250: determining, by a network node, one or more discontinuous reception cycle configurations for a user equipment of a cell of a communication network 260: communicating by the network node with the user equipment the one or more discontinuous reception configurations, wherein the communicating causes the user equipment to apply an extended discontinuous reception or discontinuous reception based on at least one of a radio resource control state of the user equipment or extended discontinuous reception allowance information received from a network node

FIG. 2B

EDRX SELECTION AND CONFIGURATION HANDLING

RELATED APPLICATION

This application claims priority to PCT Patent Application No. PCT/CN2021/072080, filed Jan. 15, 2021, and entitled "EDRX SELECTION AND CONFIGURATION HANDLING," which is incorporated herein by reference in its entirety.

TECHNICAL FIELD

The teachings in accordance with the exemplary embodiments of this invention relate generally to Extended Discontinuous Reception configurations and, more specifically, relate to optimizations related to Extended Discontinuous Reception configurations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  AMF Access and Mobility Management Function
  DRX Discontinuous Reception
  eDRX Extended Discontinuous Reception
  HO Handover
  H-SFN Hyper System Frame Number
  NAS Non-Access Stratum
  PH Paging Hyperframe
  PTW Paging Transmission Window
  SFN System Frame Number
  SI System Information
  SIB System Information Block
  RA Random Access
  RRM Radio Resource Management In 3GPP standards emerging radio-access technologies for mobile broadband have evolved to provide connectivity to many devices. One goal of these emerging technologies is to provide cost-effective connectivity with provision of excellent coverage, and supporting low power consumption.

One mechanism used for lower power consumption discontinuous reception (DRX). With DRX, a UE can be configured to turn at least part of its circuitry off during a DRX period to save power. A 3GPP Release 13 specification improves upon the original DRX mode by introducing an extended idle mode DRX (eDRX) where a network can negotiate the eDRX parameters that control the duration of the DRX cycle to further optimize UE power consumption.

Example embodiments of the invention work to improve at least these eDRX operations.

SUMMARY

This section contains examples of possible implementations and is not meant to be limiting.

In an example aspect of the invention, there is an apparatus, such as a user side apparatus, comprising: at least one processor; and at least one memory including computer program code, where the at least one memory and the computer program code are configured, with the at least one processor, to cause the apparatus to at least perform: receiving, by a user equipment, from one or more network nodes one or more extended discontinuous reception configurations, as shown in step 220 of FIG. 2A there is based on the receiving, determining by the user equipment to apply an extended discontinuous reception or discontinuous reception, wherein the determining is based on at least one of a radio resource control state of the user equipment or extended discontinuous reception allowance information received from a network node.

In another example aspect of the invention, there is a method comprising: receiving, by a user equipment, from one or more network nodes one or more extended discontinuous reception configurations; and based on the receiving, determining by the user equipment to apply an extended discontinuous reception or discontinuous reception, wherein the determining is based on at least one of a radio resource control state of the user equipment or extended discontinuous reception allowance information received from a network node.

A further example embodiment is a method comprising the method of the previous paragraph, wherein the radio resource control state comprises: an idle state or an inactive state, wherein network node comprises: a next generation NodeB gNB or an access and mobility management function AMF, wherein receiving comprises: receiving via a dedicated signalling or a broadcast signalling, wherein the allowance information comprises extended discontinuous reception cycle allowance information, wherein the allowance information is identifying whether eDRX configured by RAN s allowed or supported or can be applied on the cell, wherein the allowance information is identifying whether eDRX configured by Non-Access Stratum NAS is allowed or supported or can be applied on the cell, wherein the allowance information comprises information for at least one of IDLE or INACTIVE states, wherein the allowance information is identifying whether eDRX for IDLE state is allowed or supported or can be applied on the cell, wherein the allowance information is identifying whether eDRX for INACTIVE state is allowed or supported or can be applied on the cell, wherein the allowance information is identifying whether eDRX for both IDLE and INACTIVE states is allowed or supported or can be applied on the cell, wherein for a case extended discontinuous reception for the user equipment in INACTIVE state is not allowed or is not supported in the cell the applying comprises the user equipment triggering a RAN area update procedure or applying a discontinuous reception cycle1, wherein there is at least one of: the user equipment applying IDLE mode extended discontinuous reception in IDLE state for a case extended discontinuous reception for the user equipment in IDLE state is allowed or is supported in the cell; or the user equipment applying discontinuous reception cycle wherein for a case extended discontinuous reception for the user equipment in INACTIVE state is not allowed or is not supported in the cell and the user equipment is configured with extended discontinuous reception, the user equipment performs actions to go to IDLE state, wherein the user equipment applying IDLE mode extended discontinuous reception in IDLE state for a case extended discontinuous reception for the user equipment in IDLE state is allowed or is supported in the cell; or the user equipment applying discontinuous reception cycle, wherein the one or more discontinuous reception configurations provide dedicated control to enable extended discontinuous reception or discontinuous reception via at least one of: an RRC release message when sending the UE to IDLE or INACTIVE state; or a NAS, wherein the enabling is using NAS, and wherein the enabling is configuring at least one of a maximum extended discontinuous reception cycle allowed for the user equipment or an indication indicating a extended discontinuous reception cycle allowed for the user equipment, wherein the user equipment uses one of a minimum between NAS configured extended discontinuous reception cycle and the broadcasted extended discontinuous reception cycle, or a broadcasted extended discontinuous reception cycle, wherein the broadcasted extended discontinuous reception cycle is only used if it is shorter than the NAS configured extended discontinuous reception cycle, wherein the user equipment being configured by NAS with multiple extended discontinuous reception cycles and wherein the user equipment uses one of a minimum between NAS configured extended discontinuous reception cycles and the broadcasted extended discontinuous reception cycle, or a broadcasted extended discontinuous reception cycle, wherein the broadcasted extended discontinuous reception cycle is only used if it is shorter than any of the NAS configured extended discontinuous reception cycles, wherein the enabling extended discontinuous reception or discontinuous reception is done via an RRC release message when sending the UE to IDLE or INACTIVE state, wherein the applying comprises the user equipment to be configured with maximum extended discontinuous reception cycle which the user equipment can apply in IDLE and/or INACTIVE state by at least one of a NAS signalling or RRC release message, wherein the determining comprises based on the extended discontinuous reception configuration broadcast over system information block, SIB, for a given cell, the user equipment determines whether it is allowed to use the extended discontinuous reception in the cell or not, or which extended discontinuous reception or discontinuous reception cycle to be used, wherein for a case an extended discontinuous reception cycle allowed in the cell is longer than the maximum allowed extended discontinuous reception cycle for the UE, the UE applies discontinuous reception or applies the maximum allowed value, wherein the one or more extended discontinuous reception configurations provide an extended discontinuous reception configuration for IDLE mode comprising: an extended discontinuous reception configuration by the AMF; an extended discontinuous reception configuration by the gNB over broadcast signalling; and an extended discontinuous reception configuration by the gNB over dedicated signalling, and wherein the one or more extended discontinuous reception configurations provide an extended discontinuous reception configuration for INACTIVE mode comprising: extended discontinuous reception configuration by the AMF; extended discontinuous reception configuration by the gNB over broadcast signalling; and extended discontinuous reception configuration by the gNB over dedicated signalling.

A non-transitory computer-readable medium storing program code, the program code executed by at least one processor to perform at least the method as described in the paragraphs above.

In another example aspect of the invention, there is an apparatus comprising: means for receiving, by a user equipment, from one or more network nodes one or more extended discontinuous reception configurations; and means, based on the receiving, for determining by the user equipment to apply an extended discontinuous reception or discontinuous reception, wherein the determining is based on at least one of a radio resource control state of the user equipment or extended discontinuous reception allowance information received from a network node.

In accordance with the example embodiments as described in the paragraph above, at least the means for receiving and applying comprises a network interface, and computer program code stored on a computer-readable medium and executed by at least one processor.

A further example embodiment is an apparatus comprising the apparatus of the previous paragraphs, wherein radio resource control state comprises: an idle state or an inactive state, wherein network node comprises: a next generation NodeB gNB or an access and mobility management function AMF, wherein receiving comprises: receiving via a dedicated signalling or a broadcast signalling, and wherein messages of the at least one message comprising the discontinuous reception cycle configuration are using at least one of dedicated signalling or broadcast signalling, wherein the allowance information comprises extended discontinuous reception cycle allowance information, wherein the allowance information is identifying whether eDRX configured by RAN (e.g. gNB) is allowed or supported or can be applied on the cell, wherein the allowance information is identifying whether eDRX configured by Non-Access Stratum NAS access and mobility management function AMF is allowed or supported or can be applied on the cell, wherein the allowance information comprises separate information for at least one of IDLE or INACTIVE states, wherein the allowance information is identifying whether eDRX for IDLE mode is allowed or supported or can be applied on the cell (e.g., does not necessarily matter which network entity configured it), wherein the allowance information is identifying whether eDRX for INACTIVE mode is allowed or supported or can be applied on the cell (e.g., does not necessarily matter which network entity configured it), wherein the allowance information is identifying whether eDRX for both IDLE are INACTIVE mode is allowed or supported or can be applied on the cell on the cell (e.g., does not necessarily matter which network entity configured it), wherein for a case extended discontinuous reception cycle for the user equipment in INACTIVE mode is not allowed or is not supported in the cell the applying comprises the user equipment triggering a RAN area update procedure upon reselecting for a configuration update or applying a discontinuous reception cycle, wherein for a case extended discontinuous reception cycle for the user equipment in INACTIVE mode is not allowed or is not supported in the cell and the UE is configured with eDRX, the UE goes to IDLE mode and applies IDLE mode eDRX (if configured) or the UE applies normal DRX cycle, wherein the one or more discontinuous reception cycle configurations provide dedicated control to enable eDRX or DRX via at least one of: an RRC release message when sending the UE to IDLE/INACTIVE mode; or a NAS e.g. via registration procedure, wherein the enabling is using one bit enabling or NAS, and wherein the enabling is configuring a maximum eDRX allowed for the UE, wherein the user equipment uses one of a minimum between NAS configured maximum eDRX cycle and the SIB broadcasted eDRX cycle, or a broadcasted eDRX cycle, wherein the broadcasted eDRX cycle is only used if it is shorter than the NAS configured maximum eDRX cycle, wherein the enabling eDRX or DRX is done via at least one of: an RRC release message when sending the UE to IDLE/INACTIVE mode; a NAS e.g. via registration procedure; one of one bit enabling or NAS could additionally configure maximum eDRX allowed for the UE for NAS functionality support, wherein the applying comprises the user equipment is configured with maximum eDRX cycle the user equipment can apply in IDLE/INACTIVE state via one of NAS or RRC release message, wherein the determining comprises based on the eDRX configuration broadcast over SIB for a given cell, the user equipment determines whether it is allowed to use the eDRX in the cell or not, or which cycle to be used, wherein for a case an eDRX cycle applied in the cell is longer than the maximum allowed eDRX cycle for the UE, the UE applies normal DRX or apply the maximum allowed value, wherein the one or more discontinuous reception cycle configurations provide an eDRX configuration for IDLE mode comprising: an eDRX configuration via AMF (NAS signalling e.g. registration procedure); an eDRX configuration via gNB (RRC signaling) with broadcast signalling (system information); and an eDRX configuration via gNB (RRC signaling) with dedicated signalling (e.g. RRC Release message), and wherein the one or more discontinuous reception cycle configurations provide an eDRX configuration for INACTIVE mode comprising: eDRX configuration via AMF (NAS signalling e.g. registration procedure)\eDRX configuration via gNB (RRC signaling) with broadcast signalling (system information); and eDRX configuration via gNB (RRC signaling) with dedicated signalling (e.g. RRC Release message).

In an example aspect of the invention, there is an apparatus, such as a network side apparatus, comprising: at least one processor; and at least one memory including computer program code, where the at least one memory and the computer program code are configured, with the at least one processor, to cause the apparatus to at least perform: determining, by a network node, an extended discontinuous reception cycle configuration for a user equipment of a cell of a communication network, and communicating the extended discontinuous reception cycle configuration to the user equipment to cause the user equipment to apply an extended discontinuous reception cycle or discontinuous reception cycle, wherein the applying is based on at least one of a radio resource control state of the user equipment or extended discontinuous reception cycle allowance information received from a network node.

In another example aspect of the invention, there is a method comprising: determining, by a network node, an extended discontinuous reception cycle configuration for a user equipment of a cell of a communication network, and communicating the extended discontinuous reception cycle configuration to the user equipment to cause the user equipment to apply an extended discontinuous reception cycle or discontinuous reception cycle, wherein the applying is based on at least one of a radio resource control state of the user equipment or extended discontinuous reception cycle allowance information received from a network node.

A further example embodiment is a method comprising the method of the previous paragraph, wherein radio resource control state comprises: an idle state or an inactive state, wherein network node comprises: a next generation NodeB gNB or an access and mobility management function AMF, wherein communicating comprises: communicating via a dedicated signalling or a broadcast signalling, and wherein messages of the at least one message comprising the discontinuous reception cycle configuration are using at least one of dedicated signalling or broadcast signalling, wherein the allowance information comprises extended discontinuous reception cycle allowance information, wherein the allowance information is identifying whether eDRX configured by RAN (e.g. gNB) is allowed or supported or can be applied on the cell, wherein the allowance information is identifying whether eDRX configured by Non-Access Stratum NAS access and mobility management function AMF is allowed or supported or can be applied on the cell, wherein the allowance information comprises separate information for at least one of IDLE or INACTIVE states, wherein the allowance information is identifying whether eDRX for IDLE mode is allowed or supported or can be applied on the cell (e.g., does not necessarily matter which network entity configured it), wherein the allowance information is identifying whether eDRX for INACTIVE mode is allowed or supported or can be applied on the cell (e.g., does not necessarily matter which network entity configured it), wherein the allowance information is identifying whether eDRX for both IDLE are INACTIVE mode is allowed or supported or can be applied on the cell on the cell (e.g., does not necessarily matter which network entity configured it).

A non-transitory computer-readable medium storing program code, the program code executed by at least one processor to perform at least the method as described in the paragraphs above.

In another example aspect of the invention, there is an apparatus comprising: means for determining, by a network node, an extended discontinuous reception cycle configuration for a user equipment of a cell of a communication network, and means for communicating the extended discontinuous reception cycle configuration to the user equipment to cause the user equipment to apply an extended discontinuous reception cycle or discontinuous reception cycle, wherein the applying is based on at least one of a radio resource control state of the user equipment or extended discontinuous reception cycle allowance information received from a network node.

In accordance with the example embodiments as described in the paragraph above, at least the means for receiving and applying comprises a network interface, and computer program code stored on a computer-readable medium and executed by at least one processor.

A further example embodiment is an apparatus comprising the apparatus of the previous paragraphs, wherein radio resource control state comprises: an idle state or an inactive state, wherein network node comprises: a next generation NodeB gNB or an access and mobility management function AMF, wherein communicating comprises: communicating via a dedicated signalling or a broadcast signalling, and wherein messages of the at least one message comprising the discontinuous reception cycle configuration are using at least one of dedicated signalling or broadcast signalling, wherein the allowance information comprises extended discontinuous reception cycle allowance information, wherein the allowance information is identifying whether eDRX configured by RAN (e.g. gNB) is allowed or supported or can be applied on the cell, wherein the allowance information is identifying whether eDRX configured by Non-Access Stratum NAS access and mobility management function AMF is allowed or supported or can be applied on the cell, wherein the allowance information comprises separate information for at least one of IDLE or INACTIVE states, wherein the allowance information is identifying whether eDRX for IDLE mode is allowed or supported or can be applied on the cell (e.g., does not necessarily matter which network entity configured it), wherein the allowance information is identifying whether eDRX for INACTIVE mode is allowed or supported or can be applied on the cell (e.g., does not necessarily matter which network entity configured it), wherein the allowance information is identifying whether eDRX for both IDLE are INACTIVE mode is allowed or supported or can be applied on the cell on the cell (e.g., does not necessarily matter which network entity configured it).

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 2A and FIG. 2B each show a method in accordance with example embodiments of the invention which may be performed by an apparatus.

DETAILED DESCRIPTION

Figure 1:
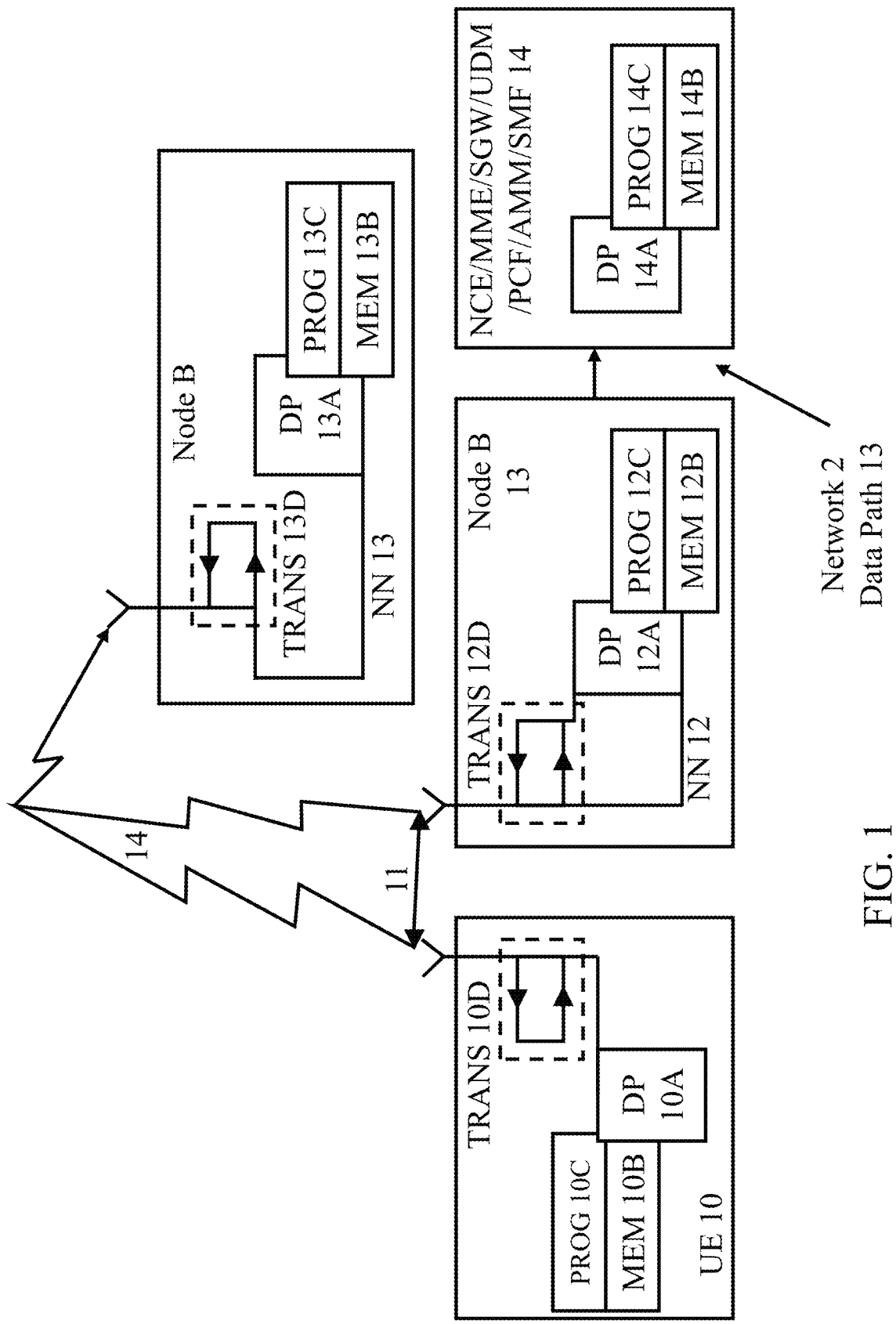
FIG. 1 shows a block diagram of one possible and non-limiting exemplary system in which the example embodiments of the invention may be practiced.

In example embodiment of the invention, there is proposed optimizations related to Extended Discontinuous Reception configurations.

Example embodiments of the invention relates to SI introducing low cost power efficient UEs with reduced capability (REDCAP UE) which was originally known as NR-Light. In addition invention could be applicable to any device i.e. not only for RedCap devices.

Particularly, in example embodiments of this invention we focus on eDRX for INACTIVE and IDLE UEs. The following agreements have been reached so far:

---

Identify and study potential UE complexity reduction features, including [RAN1, RAN2]:
- Reduced number of UE RX/TX antennas
- UE Bandwidth reduction
  Note: Rel-15 SSB bandwidth should be reused and L1 changes minimized
- Half-Duplex-FDD
- Relaxed UE processing time
- Relaxed UE processing capability Note1: The work defined above should not overlap with LPWA use cases. The lowest capability considered should be no less than an LTE Category 1bis modem.

Study UE power saving and battery lifetime enhancement for reduced capability UEs in applicable use cases (e.g. delay tolerant) [RAN2, RAN1]:
- Reduced PDCCH monitoring by smaller numbers of blind decodes and CCE limits [RAN1].
- Extended DRX for RRC Inactive and/or Idle [RAN2]
- RRM relaxation for stationary devices [RAN2]

Study functionality that will enable the performance degradation of such complexity reduction to be mitigated or limited, including [RAN1]:
- Coverage recovery to compensate for potential coverage reduction due to the device complexity reduction.

Study standardization framework and principles for how to define and constrain such reduced capabilities - considering definition of a limited set of one or more device types and considering how to ensure those device types are only used for the intended use cases [RAN2, RAN1].

Study functionality that will allow devices with reduced capabilities to be explicitly identifiable to networks and network operators, and allow operators to restrict their access, if desired [RAN2, RAN1].

Note2: Potential overlap with coverage enhancements study is discussed and resolved in RAN#87.
Note3: Coexistence with Rel-15 and Rel-16 UE should be ensured
Note4: This SI should focus on SA mode and single connectivity

---

The following was agreed in RAN2 #111e meeting for eDRX:

---

Agreements:
1. RAN2 study eDRX mechanism for both RRC_IDLE and RRC_INACTIVE in this SI.
2. For RRC_INACTIVE, the DRX cycle is extended to 10.24s as baseline.

---

Agreements via email - from offline 111:
1. For RRC_IDLE, the DRX cycle is at least extended to 10.24s. FFS on further extension beyond 10.24s.
2. For RRC_IDLE and/or RRC_INACTIVE, if the NR DRX cycle range is extended beyond 10.24s, the LTE eDRX mechanism beyond 10.24s (e.g., PTW, PH, etc.) is used as baseline when NR eDRX cycle is configured beyond 10.24s.

FFS:
1. For RRC_IDLE and/or RRC_INACTIVE, FFS on baseline mechanism when the configured NR eDRX cycle is less or equal to 10.24s

---

And the following was agreed in RAN2 #112e meeting:

---

Agreements via email - offline 114:
1. For UE in RRC IDLE/INACTIVE and eDRX cycle is less than 10.24s, paging monitoring does not use PTW and PH, if any.
2. The target REDCAP UE, considering mobility, is not limited to a fixed UE, but can also experience some low mobility, and this, during some "stationary" periods of time.
3. The RRM relaxation of REDCAP UEs is triggered based on measurements, as a baseline. Other triggering conditions for the "level-1" (still device at fixed location) UEs are not excluded, e.g. the possibility to signal their stationary property explicitly.
4. R16 NR RRM relaxation procedures are taken as a baseline to study further enhancements of neighbor cells RRM relaxation for REDCAP UEs in RRC IDLE/INACTIVE.

---

Agreements:
1. Relaxation of neighbor cells RRM measurements in RRC_CONNECTED will be studied in this SI/WI
2. RAN2 will study whether lower values than 5.12s for eDRX cycle for RRC_IDLE and RRC_INACTIVE REDCAP UEs, e.g. 2.56s, can also be considered.
3. eDRX cycle extension in RRC_IDLE beyond 10.24s for REDCAP UEs will be studied in this SI/WI. For UE in RRC IDLE and eDRX cycle is equal to 10.24s, among the solution options, we start from the assumption that paging monitoring does not use PTW and PH.
4. the eDRX cycle in RRC_IDLE is extended up to 2621.44s for REDCAP UEs, as a baseline (longer value e.g. 10485.76s can also be considered)

---

In LTE eDRX can be configured for IDLE mode, but in NR intention is to support eDRX also in INACTIVE. In LTE eDRX cycle is configured by upper layers (NAS) but in NR DRX cycle for INACTIVE mode it would make more sense to be configured by RAN since from CN point of view, the UE is in CONNECTED mode. Compared to LTE, for NW, signaling is needed so that eDRX can be configured for both IDLE and INACTIVE and also so that both RAN and AMF can configure the eDRX cycle.

Further, LTE eDRX is configured by upper layers (i.e. NAS) for the IDLE mode UE and eNB can control on the cell level whether the UE is allowed to use eDRX in IDLE mode e.g. in case the cell is not supporting eDRX. The same principle would not work for NR/INACTIVE mode UE, because the intention is to support eDRX in both IDLE and INACTIVE. In addition at this point of time it is not clear which entity configures the eDRX for the UE i.e. RAN or core network. In NR REL15 DRX cycle for INACTIVE is configured by RAN and it could be designed in similar way also for eDRX.

In LTE MME knows when the UE is in eDRX used in IDLE mode and the MME will only send the paging request to eNB just before the PTW. Further, In LTE eDRX is only applicable in IDLE mode i.e. not in INACTIVE mode. According to 3GPP TS 36.331:

--- eDRX-Allowed
The presence of this field indicates if idle mode extended DRX is allowed in the cell for the UE connected to EPC. The UE shall stop using extended
DRX in idle mode if eDRX-Allowed is not present when connected to EPC.
eDRX-Allowed-5GC
The presence of this field indicates if idle mode extended DRX is allowed in the cell for the UE connected to 5GC. The UE shall stop using extended
DRX in idle mode if eDRX-Allowed-5GC is not present when connected to 5GC.

---

3GPP TS 36.300 the following is specified:

---

When extended DRX (eDRX) is used in idle mode, the following are applicable:
- The DRX cycle is extended up to and beyond 10.24s in idle mode, with a maximum value of 2621.44 seconds (43.69 minutes); For NB-IoT, the maximum value of the DRX cycle is 10485.76 seconds (2.91 hours);
- The hyper SFN (H-SFN) is broadcast by the cell and increments by one when the SFN wraps around;
- Paging Hyperframe (PH) refers to the H-SFN in which the UE starts monitoring paging DRX during a Paging Time Window (PTW) used in ECM-IDLE. The PH is determined based on a formula that is known by the MME/AMF, UE and (ng-)eNB as a function of eDRX cycle and UE identity;
- During the PTW, the UE monitors paging for the duration of the PTW (as configured by NAS) or until a paging message is including the UE's NAS identity received for the UE, whichever is earlier. The possible starting offsets for the PTW are uniformly distributed within the PH and defined in TS 36.304 [11];
- MME/AMF uses the formulas defined in TS 36.304 [11] to determine the PH as well as the beginning of the PTW and sends the S1 paging request just before the occurrence of the start of PTW or during PTW to avoid storing paging messages in the (ng-)eNB;

---

Example embodiments of the invention work to prove at least methods and apparatus to perform broadcast signalling for eDRX, and application of cell specific eDRX other than LTE type of UE specific eDRX, and application of cell specific eDRX.

Before describing the example embodiments of the invention in detail, reference is made to FIG. 1 for illustrating a simplified block diagram of various electronic devices that are suitable for use in practicing the example embodiments of this invention.

FIG. 1 shows a block diagram of one possible and non-limiting exemplary system in which the example embodiments of the invention may be practiced. In FIG. 1, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 11.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 1. The NN 12 provides access to wireless devices such as the UE 10 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 or link 14 and or any other link may be wired or wireless or both and may implement, e.g., an X2 or Xn interface. Further the link 11 may be through other network devices such as, but not limited to an NCE/SGW/AMF/UPF device such as the NCE/MME/SGW/UDM/PCF/AMM/SMF 14 of FIG. 1. The NN 12 may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 via link 14 and communicate with the UE 10 via for example link 14 or another link. These links may be wired or wireless or both and may implement, e.g., an X2 or Xn interface. Further, as stated above the link 11 may be through other network devices such as, but not limited to an NCE/MME/SGW device such as the NCE/MME/SGW/UDM/PCF/AMM/SMF 14 of FIG. 1. The connection between the NCE/MME/SGW/UDM/PCF/AMM/SMF 14 and the NN 12, NN 13, and/or UE 10 can be made via data path 13 which can be connected to links 11 and/or link 14.

The one or more buses of the device of FIG. 1 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses could be implemented in part as fiber optic cable to connect the other elements of the NN 12 to a RRH.

It is noted that although FIG. 1 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 11 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, NN 12, NN 13, and other functions as described herein.

In one example, it is proposed broadcast signalling for eDRX (including e.g. eDRX cycle, PTW, etc), and application of cell specific eDRX other than LTE type of UE specific eDRX, since RAN handles the UEs in INACTIVE mode (i.e. paging is initiated by RAN (RAN paging) and DRX cycle is configured by RAN etc.) and the NW is not aware of which cell the UE is in INACTIVE mode. EDRX configuration (including e.g. eDRX cycle, PTW etc.) is configured via SIB together with legacy DRX. It is further dedicatedly controlled if a UE is allowed to use eDRX and it is only allowed use legacy DRX. Or alternatively only UEs supporting eDRX uses eDRX based on broadcasted configuration.

In a non-limiting example, eDRX configuration for INACTIVE or IDLE mode UE is configured by RAN (e.g. gNB) for example in the RRC Release message when the UE is moved to INACTIVE mode or IDLE.

In one example one or more network broadcasts from one or more network nodes indicate whether eDRX configured by RAN (e.g. gNB) is allowed or supported on the cell. Additionally separate information can be broadcasted for at least one of IDLE or INACTIVE states.

In one example, eDRX configuration for INACTIVE or IDLE mode UE is configured by core network (e.g. NAS or AMF etc.).

In one example network broadcast whether eDRX configured by core network (e.g. NAS or AMF etc.) is allowed or supported on the cell. Additionally separate information can be broadcasted for at least one of IDLE or INACTIVE states.

In one example, in case the eDRX for INACTIVE mode is not allowed or not supported in the cell and the UE is configured with eDRX, the UE triggers RAN area update procedure upon reselecting on such cell to update the configuration or the UE applies normal DRX cycle. Alternatively, any other RRC procedure may also be used to advise NW about the UE accessing a cell where eDRX in INACTIVE is not supported when configured for the UE.

In one example, in case the eDRX for INACTIVE mode is not allowed or not supported in the cell and the UE is configured with eDRX, the UE goes to IDLE mode and applies IDLE mode eDRX (if configured) or the UE applies normal DRX cycle.

In one example network broadcast whether eDRX for IDLE mode is allowed or supported on the cell.

In one example network broadcast whether eDRX for INACTIVE mode is allowed or supported on the cell.

In one example network broadcast whether eDRX for both IDLE are INACTIVE mode is allowed or supported on the cell.

Further in accordance with an example embodiment of the invention dedicated control to enable eDRX or DRX is done via at least one of the following:
  Enabled via RRC release message when sending the UE to IDLE/INACTIVE mode;
  Enabled via NAS e.g. via registration procedure;
    It could be one bit enabling or NAS could additionally configure maximum eDRX allowed for the UE since NAS functionality also needed to support for eDRX, and/or
    The UE uses the minimum between NAS configured maximum eDRX cycle and the SIB broadcasted eDRX cycle, or the broadcasted eDRX cycle is only used if it is shorter than the NAS configured maximum eDRX cycle.

The broadcasted EDRX is used for a UE if it is enabled in RRC message, or NAS or both for the UE, otherwise DRX is used.

Additionally or alternatively, the UE is configured with maximum eDRX cycle the UE can apply in IDLE/INACTIVE state, e.g., via NAS or RRC releasee message. Based on the eDRX configuration broadcast over SIB for a given cell, UE determines whether it is allowed to use the eDRX in the cell or not, or which cycle to be used. In case the eDRX cycle applied in the cell is longer than the maximum allowed eDRX cycle for the UE, the UE applies normal DRX or apply the maximum allowed value.

In one example, the NW can broadcast multiple eDRX configurations within a cell and/or multiple eDRX cycles. The UE applies the longest eDRX cycle it is allowed to use.

In accordance with example embodiments of the invention there is an:
  An eDRX configuration for IDLE mode:
    eDRX configuration via AMF (NAS signalling e.g. registration procedure);
    eDRX configuration via gNB (RRC signaling) with broadcast signalling (system information); and
    eDRX configuration via gNB (RRC signaling) with dedicated signalling (e.g. RRC Release message).
  An eDRX configuration for INACTIVE mode:
    eDRX configuration via AMF (NAS signalling e.g. registration procedure);
    eDRX configuration via gNB (RRC signaling) with broadcast signalling (system information); and
    eDRX configuration via gNB (RRC signaling) with dedicated signalling (e.g. RRC Release message).

Further in accordance with example embodiments of the invention there is an Allowance part wherein eDRX "allowed" indication options via system information (if not allowed the UE shall use DRX instead):
  Network broadcast whether eDRX configured by RAN (e.g. gNB) is allowed or supported or can be applied on the cell,
    Additionally separate information can be broadcasted for IDLE and/or INACTIVE states;
  Network broadcast whether eDRX configured by NAS (e.g. AMF) is allowed or supported or can be applied on the cell,
    Additionally separate information can be broadcasted for IDLE and/or INACTIVE states;
  network broadcast whether eDRX for IDLE mode is allowed or supported or can be applied on the cell (e.g., does not necessarily matter which network entity configured it);
  network broadcast whether eDRX for INACTIVE mode is allowed or supported or can be applied on the cell (e.g., does not necessarily matter which network entity configured it);
  network broadcast whether eDRX for both IDLE are INACTIVE mode is allowed or supported or can be applied on the cell on the cell (e.g., does not necessarily matter which network entity configured it); and
  Upper layer (e.g. NAS, AMF, e.g. in registration procedure) indicates whether eDRX configured by RAN (gNB) is allowed. Separate information can be signalled for IDLE and INACTIVE.

FIG. 2A illustrates operations which may be performed by a device such as, but not limited to, a device (e.g., the UE 10 as in FIG. 1). As shown in step 210 of FIG. 2A there is receiving, by a user equipment, from one or more network nodes one or more extended discontinuous reception configurations, as shown in step 220 of FIG. 2A there is based on the receiving, determining by the user equipment to apply an extended discontinuous reception or discontinuous reception, wherein the determining is based on at least one of a radio resource control state of the user equipment or extended discontinuous reception allowance information received from a network node.

In accordance with an example aspect of the invention, wherein the radio resource control state comprises: an idle state or an inactive state.

In accordance with an example aspect of the invention, wherein network node comprises: a next generation NodeB gNB or an access and mobility management function AMF.

In accordance with an example aspect of the invention, wherein receiving comprises: receiving via a dedicated signalling or a broadcast signalling.

In accordance with an example aspect of the invention, wherein the allowance information comprises extended discontinuous reception cycle allowance information.

In accordance with an example aspect of the invention, wherein the allowance information is identifying whether eDRX configured by RAN s allowed or supported or can be applied on the cell.

In accordance with an example aspect of the invention, wherein the allowance information is identifying whether eDRX configured by Non-Access Stratum NAS is allowed or supported or can be applied on the cell.

In accordance with an example aspect of the invention, wherein the allowance information comprises information for at least one of IDLE or INACTIVE states.

In accordance with an example aspect of the invention, wherein the allowance information is identifying whether eDRX for IDLE state is allowed or supported or can be applied on the cell.

In accordance with an example aspect of the invention, wherein the allowance information is identifying whether eDRX for INACTIVE state is allowed or supported or can be applied on the cell.

In accordance with an example aspect of the invention, wherein the allowance information is identifying whether eDRX for both IDLE and INACTIVE states is allowed or supported or can be applied on the cell.

In accordance with an example aspect of the invention, wherein for a case extended discontinuous reception for the user equipment in INACTIVE state is not allowed or is not supported in the cell the applying comprises the user equipment triggering a RAN area update procedure or applying a discontinuous reception cycle.

In accordance with an example aspect of the invention, wherein for a case extended discontinuous reception for the user equipment in INACTIVE state is not allowed or is not supported in the cell and the user equipment is configured with extended discontinuous reception, the user equipment performs actions to go to IDLE state.

In accordance with an example aspect of the invention, there is least one of: the user equipment applying IDLE mode extended discontinuous reception in IDLE state for a case extended discontinuous reception for the user equipment in IDLE state is allowed or is supported in the cell; or the user equipment applying discontinuous reception cycle.

In accordance with an example aspect of the invention, wherein the one or more discontinuous reception configurations provide dedicated control to enable extended discontinuous reception or discontinuous reception via at least one of: an RRC release message when sending the UE to IDLE or INACTIVE state; or a NAS.

In accordance with an example aspect of the invention, wherein the enabling is using NAS, and wherein the enabling is configuring at least one of a maximum extended discontinuous reception cycle allowed for the user equipment or an indication indicating a extended discontinuous reception cycle allowed for the user equipment.

In accordance with an example aspect of the invention, wherein the user equipment uses one of a minimum between NAS configured extended discontinuous reception cycle and the broadcasted extended discontinuous reception cycle, or a broadcasted extended discontinuous reception cycle, wherein the broadcasted extended discontinuous reception cycle is only used if it is shorter than the NAS configured extended discontinuous reception cycle.

In accordance with an example aspect of the invention, the user equipment being configured by NAS with multiple extended discontinuous reception cycles and wherein the user equipment uses one of a minimum between NAS configured extended discontinuous reception cycles and the broadcasted extended discontinuous reception cycle, or a broadcasted extended discontinuous reception cycle, wherein the broadcasted extended discontinuous reception cycle is only used if it is shorter than any of the NAS configured extended discontinuous reception cycles.

In accordance with an example aspect of the invention, wherein the enabling extended discontinuous reception or discontinuous reception is done via an RRC release message when sending the UE to IDLE or INACTIVE state.

In accordance with an example aspect of the invention, wherein the applying comprises the user equipment to be configured with maximum extended discontinuous reception cycle which the user equipment can apply in IDLE and/or INACTIVE state by at least one of a NAS signalling or RRC release message.

In accordance with an example aspect of the invention, wherein the determining comprises based on the extended discontinuous reception configuration broadcast over system information block, SIB, for a given cell, the user equipment determines whether it is allowed to use the extended discontinuous reception in the cell or not, or which extended discontinuous reception or discontinuous reception cycle to be used.

In accordance with an example aspect of the invention, wherein for a case an extended discontinuous reception cycle allowed in the cell is longer than the maximum allowed extended discontinuous reception cycle for the UE, the UE applies discontinuous reception or applies the maximum allowed value.

In accordance with an example aspect of the invention, wherein the one or more extended discontinuous reception configurations provide an extended discontinuous reception configuration for IDLE mode comprising: an extended discontinuous reception configuration by the AMF; an extended discontinuous reception configuration by the gNB over broadcast signalling; and an extended discontinuous reception configuration by the gNB over dedicated signalling.

In accordance with an example aspect of the invention, wherein the one or more extended discontinuous reception configurations provide an extended discontinuous reception configuration for INACTIVE mode comprising: extended discontinuous reception configuration by the AMF; extended discontinuous reception configuration by the gNB over broadcast signalling; and extended discontinuous reception configuration by the gNB over dedicated signalling.

A non-transitory computer-readable medium (MEM 10B as in FIG. 1) storing program code (PROG 10C as in FIG. 1), the program code executed by at least one processor (DP 10A as in FIG. 1) to perform the operations as at least described in the paragraphs above.

In accordance with an example embodiment of the invention as described above there is an apparatus comprising: means for receiving (TRANS 10D, PROG 10C, MEM 10B, and DP 10A as in FIG. 1), by a user equipment (UE 10 as in FIG. 1) of a cell of a communication network (Network 1 as in FIG. 1), from one or more network nodes (NN 12 and/or NN 13 as in FIG. 1) at least one message comprising one or more extended discontinuous reception cycle configurations; means for determining (TRANS 10D, PROG 10C, MEM 10B, and DP 10A as in FIG. 1) by the user equipment to apply (TRANS 10D, PROG 10C, MEM 10B, and DP 10A as in FIG. 1) an extended discontinuous reception cycle or discontinuous reception cycle, wherein the determining is based on at least one of a radio resource control state of the user equipment or extended discontinuous reception cycle allowance information received from a network node.

In the example aspect of the invention according to the paragraph above, wherein at least the means for receiving and determining comprises transceiver [TRANS 10D in FIG. 1] a non-transitory computer readable medium [MEM 10B as in FIG. 1] encoded with a computer program [PROG 10C as in FIG. 1] executable by at least one processor [DP 10A as in FIG. 1].

FIG. 2B illustrates operations which may be performed by a network device such as, but not limited to, a network node NN 12 or NN 13 as in FIG. 1 or an eNB. As shown in step

250 of FIG. 2B there is determining, by a network node, or more discontinuous reception cycle configurations for a user equipment of a cell of a communication network. Then as shown in step 260 of FIG. 2B there is communicating by the network node with the user equipment the one or more discontinuous reception configurations, wherein the communicating causes the user equipment to apply an extended discontinuous reception or discontinuous reception based on at least one of a radio resource control state of the user equipment or extended discontinuous reception allowance information received from a network node.

In accordance with the example embodiments as described in the paragraph above, wherein radio resource control state comprises: an idle state or an inactive state.

In accordance with the example embodiments as described in the paragraphs above, wherein network node comprises: a next generation NodeB gNB or an access and mobility management function AMF.

In accordance with the example embodiments as described in the paragraphs above, wherein communicating comprises: communicating via a dedicated signalling or a broadcast signalling, and wherein messages of the at least one message comprising the discontinuous reception cycle configuration are using at least one of dedicated signalling or broadcast signalling.

In accordance with the example embodiments as described in the paragraphs above, wherein the allowance information comprises extended discontinuous reception cycle allowance information.

In accordance with the example embodiments as described in the paragraphs above, wherein the allowance information is identifying whether eDRX configured by RAN (e.g. gNB) is allowed or supported or can be applied on the cell.

In accordance with the example embodiments as described in the paragraphs above, wherein the allowance information is identifying whether eDRX configured by Non-Access Stratum NAS access and mobility management function AMF is allowed or supported or can be applied on the cell.

In accordance with the example embodiments as described in the paragraphs above, wherein the allowance information comprises information for at least one of an IDLE state or INACTIVE state.

In accordance with the example embodiments as described in the paragraphs above, wherein the allowance information is identifying whether eDRX for IDLE state is allowed or supported or can be applied on the cell (e.g., does not necessarily matter which network entity configured it).

In accordance with the example embodiments as described in the paragraphs above, wherein the allowance information is identifying whether eDRX for INACTIVE state is allowed or supported or can be applied on the cell (e.g., does not necessarily matter which network entity configured it).

In accordance with the example embodiments as described in the paragraphs above, wherein the allowance information is identifying whether eDRX for both IDLE are INACTIVE state is allowed or supported or can be applied on the cell on the cell (e.g., does not necessarily matter which network entity configured it).

A non-transitory computer-readable medium (MEM 12B and/or MEM 13B as in FIG. 1) storing program code (PROG 12C and/or PROG 13C as in FIG. 1), the program code executed by at least one processor (DP 12A and/or DP 13A as in FIG. 1) to perform the operations as at least described in the paragraphs above.

In accordance with an example embodiment of the invention as described above there is an apparatus comprising: means for determining (TRANS 12D and/or TRANS 13D; MEM 12B, and/or MEM 13B; PROG 12C, and/or PROG 13C; and DP 12A, and/or DP 13A as in FIG. 1), by a network node (NN 12 and/or NN 13 as in FIG. 1), an one or more messages comprising one or more discontinuous reception cycle configurations for a user equipment (UE 10 as in FIG. 1) of a cell of a communication network (Network 1 as in FIG. 1); and means for communicating (TRANS 12D and/or TRANS 13D; MEM 12B, and/or MEM 13B; PROG 12C, and/or PROG 13C; and DP 12A, and/or DP 13A as in FIG. 1) by the network node with the user equipment the one or more messages, wherein the communicating causes the user equipment to apply (TRANS 10D, PROG 10C, MEM 10B, and DP 10A as in FIG. 1) an extended discontinuous reception cycle or discontinuous reception cycle based on at least one of a radio resource control state of the user equipment or extended discontinuous reception cycle allowance information received from a network node In the example aspect of the invention according to the paragraph above, wherein at least the means for determining and communicating comprises transceiver [TRANS 12D and/or TRANS 13D as in FIG. 1] a non-transitory computer readable medium [MEM 12B and/or MEM 13B as in FIG. 1] encoded with a computer program [PROG 12C and/or PROG 13C as in FIG. 1] executable by at least one processor [DP 12A and/or DP 13A as in FIG. 1].

Example embodiments of the invention provide advantages including at least:

SIB is used for IDLE/INACTIVE mode eDRX configuration but it allows dedicated control at the same time so that only delay tolerant UEs (e.g. REDCAP UEs) will use eDRX; and enables common eDRX cycle to be applied within a cell.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
 (a) hardware-only circuit implementations (such as implementations in only analog and/or digital circuitry);
 (b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this ' circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof

What is claimed is:

1. A method comprising:

receiving, by a user equipment in a cell, from one or more network nodes, one or more extended discontinuous reception configurations; and based on the receiving, determining, by the user equipment, to apply an extended discontinuous reception or a discontinuous reception, wherein the determining is based on a radio resource control state of the user equipment and extended discontinuous reception allowance information received from a network node of the one or more network nodes, wherein the radio resource control state comprises an IDLE state or an INACTIVE state, and wherein the extended discontinuous reception allowance information comprises separate information for identifying (i) whether the extended discontinuous reception for the IDLE state is allowed in the cell, and (ii) whether the extended discontinuous reception for the INACTIVE state is allowed in the cell.

2. A user equipment comprising:

at least one processor; and at least one memory comprising instructions stored therein that, when executed by the at least one processor, cause the user equipment to perform at least:

receiving, by the user equipment in a cell, from one or more network nodes, one or more extended discontinuous reception configurations; and based on the receiving, determining, by the user equipment, to apply an extended discontinuous reception or a discontinuous reception, wherein the determining is based on a radio resource control state of the user equipment and extended discontinuous reception allowance information received from a network node of the one or more network nodes, wherein the radio resource control state comprises an IDLE state or an INACTIVE state, and wherein the extended discontinuous reception allowance information comprises separate information for identifying:
(i) whether the extended discontinuous reception for the IDLE state is allowed in the cell; and
(ii) whether the extended discontinuous reception for the INACTIVE state is allowed in the cell.

3. The user equipment of claim 2, wherein the one or more extended discontinuous reception configurations are received via dedicated signaling, and wherein the extended discontinuous reception allowance information is received via broadcast signaling.

4. The user equipment of claim 2, wherein the extended discontinuous reception allowance information is identifying whether the extended discontinuous reception configured by a radio access network is allowed in the cell.

5. The user equipment of claim 2, wherein, if the extended discontinuous reception for the user equipment in the INACTIVE state is not allowed in the cell, the applying comprises the user equipment triggering a radio access network area update procedure or applying a discontinuous reception cycle.

6. The user equipment of claim 2, wherein the one or more extended discontinuous reception configurations provide dedicated control to enable the extended discontinuous reception or the discontinuous reception via at least one of:
an RRC release message when sending the user equipment to IDLE or INACTIVE state; or
a non-access stratum.

7. The user equipment of claim 6, wherein the enabling is using the non-access stratum, and wherein the enabling is configuring at least one of a maximum extended discontinuous reception cycle allowed for the user equipment or an indication indicating an extended discontinuous reception cycle allowed for the user equipment.

8. The user equipment of claim 7, wherein the user equipment is configured by the non-access stratum with multiple extended discontinuous reception cycles, and wherein the instructions stored in the at least one memory, when executed by the at least one processor, further cause the user equipment to perform:
using one of: a minimum between non-access stratum configured extended discontinuous reception cycles and the broadcasted extended discontinuous reception cycle or a broadcasted extended discontinuous reception cycle,
wherein the broadcasted extended discontinuous reception cycle is only used if it is shorter than any of the non-access stratum configured extended discontinuous reception cycles.

9. The user equipment of claim 6, wherein the instructions stored in the at least one memory, when executed by the at least one processor, further cause the user equipment to perform:
using one of: a minimum between non-access stratum configured extended discontinuous reception cycle and the broadcasted extended discontinuous reception cycle, or a broadcasted extended discontinuous reception cycle,
wherein the broadcasted extended discontinuous reception cycle is only used if it is shorter than the non-access stratum configured extended discontinuous reception cycle.

10. The user equipment of claim 2, wherein the applying comprises the user equipment being configured with maximum extended discontinuous reception cycle which the user equipment can apply in IDLE and/or INACTIVE state by at least one of: non-access stratum signaling or a radio resource control release message.

11. The user equipment of claim 2, wherein the one or more extended discontinuous reception configurations provide an extended discontinuous reception configuration for IDLE state comprising the extended discontinuous reception configuration by an access and mobility function.

12. The user equipment of claim 2, wherein the one or more extended discontinuous reception configurations provide an extended discontinuous reception configuration for INACTIVE state comprising the extended discontinuous reception configuration by a next generation NodeB (gNB) over dedicated signaling.

13. The user equipment of claim 2, wherein the network node comprises a next generation NodeB (gNB) or an access and mobility management function (AMF).

14. The user equipment of claim 2, wherein the extended discontinuous reception allowance information is identifying whether the extended discontinuous reception configured by non-access stratum is allowed in the cell.

15. A non-transitory computer-readable storage medium comprising program codes, the program codes comprising instructions which, when executed by at least one processor of a user equipment, cause the user equipment to perform at least:
receiving, by the user equipment in a cell, from one or more network nodes, one or more extended discontinuous reception configurations; and
based on the receiving, determining, by the user equipment, to apply an extended discontinuous reception or a discontinuous reception,
wherein the determining is based on a radio resource control state of the user equipment and extended discontinuous reception allowance information received from a network node of the one or more network nodes,
wherein the radio resource control state comprises an IDLE state or an INACTIVE state, and
wherein the extended discontinuous reception allowance information comprises separate information for identifying
(i) whether the extended discontinuous reception for the IDLE state is allowed in the cell, and
(ii) whether the extended discontinuous reception for the INACTIVE state is allowed in the cell.

* * * * *